United States Patent [19]

Svenson

[11] 4,271,347

[45] Jun. 2, 1981

[54] METHOD AND APPARATUS FOR ACCELERATING CHEMICAL REACTIONS USING A SPREAD BEAM DEFLECTOR WITH SINGLE OR MULTIPLE REFLECTORS

[75] Inventor: Hardy C. Svenson, Arlington, Va.

[73] Assignee: The United States of America as represented by the Secretary of the Treasury, Washington, D.C.

[21] Appl. No.: 952,886

[22] Filed: Oct. 18, 1978

[51] Int. Cl.³ .............................................. B23K 27/00
[52] U.S. Cl. ........................... 219/121 L; 101/416 A;
219/121 LQ; 350/294; 427/53.1
[58] Field of Search ...... 219/121 L, 121 LM, 121 LP,
219/121 LQ, 121 LR; 427/53, 53.1; 350/295,
294; 400/696; 101/416 A, 416 R; 346/76 L

[56] References Cited

U.S. PATENT DOCUMENTS

| 840,084 | 1/1907 | Müller | 350/295 |
|---|---|---|---|
| 1,457,209 | 5/1923 | Chanier | 350/295 |
| 3,410,203 | 11/1968 | Fischbeck | 346/76 L |
| 3,597,579 | 8/1971 | Lumley | 219/121 LM |
| 3,848,104 | 11/1974 | Locke | 219/121 L |
| 4,009,364 | 2/1977 | Ladstädter | 219/121 L |
| 4,099,830 | 7/1978 | Whittle et al. | 219/121 L X |

Primary Examiner—C. L. Albritton
Attorney, Agent, or Firm—Joseph A. Hill; Thomas J. Scott, Jr.; Claud A. Daigle, Jr.

[57] ABSTRACT

An apparatus for spreading a coherent light beam produced by a laser or lasers into a selected pattern. The selected pattern of coherent light, generally a ribbon-like shape, can be used to place a desired amount of electromagnetic energy at a selected frequency for a selected time period on a generally flat surface. The projected coherent light pattern can be used to cure or dry inks without scorching the underlying paper. The control of the intensity of the coherent light allows drying operations at higher speeds than currently feasible.

11 Claims, 3 Drawing Figures

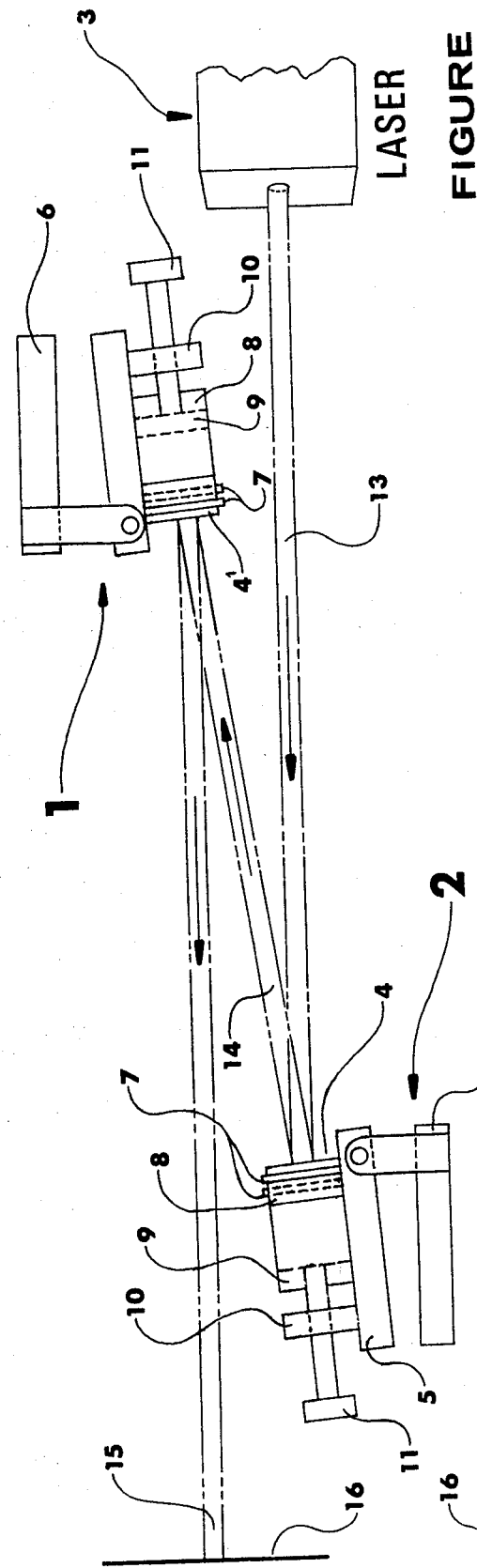
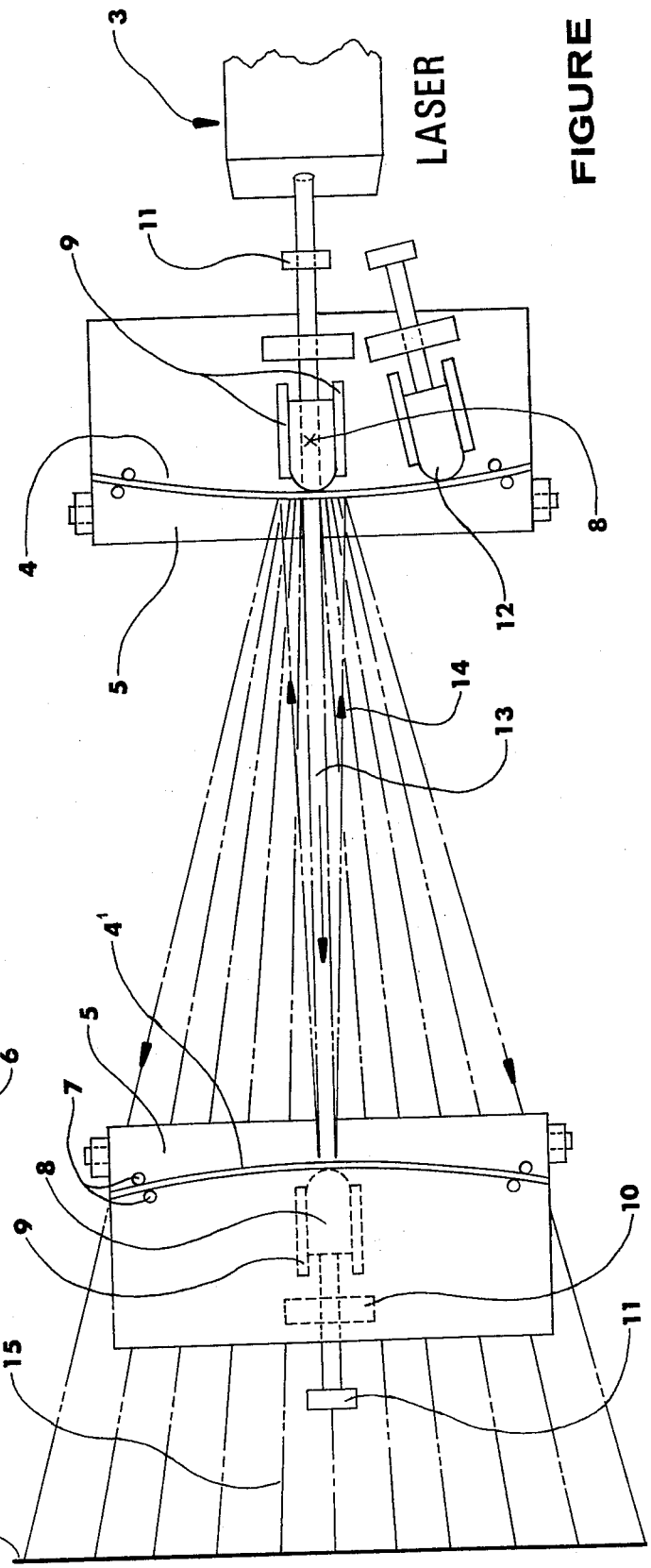

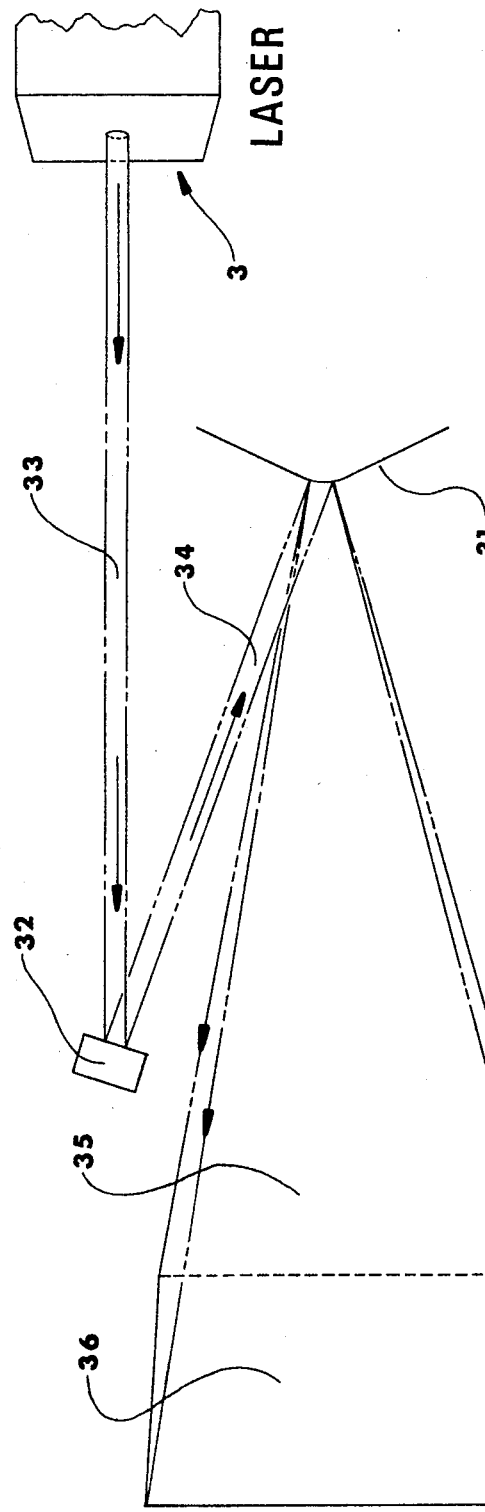
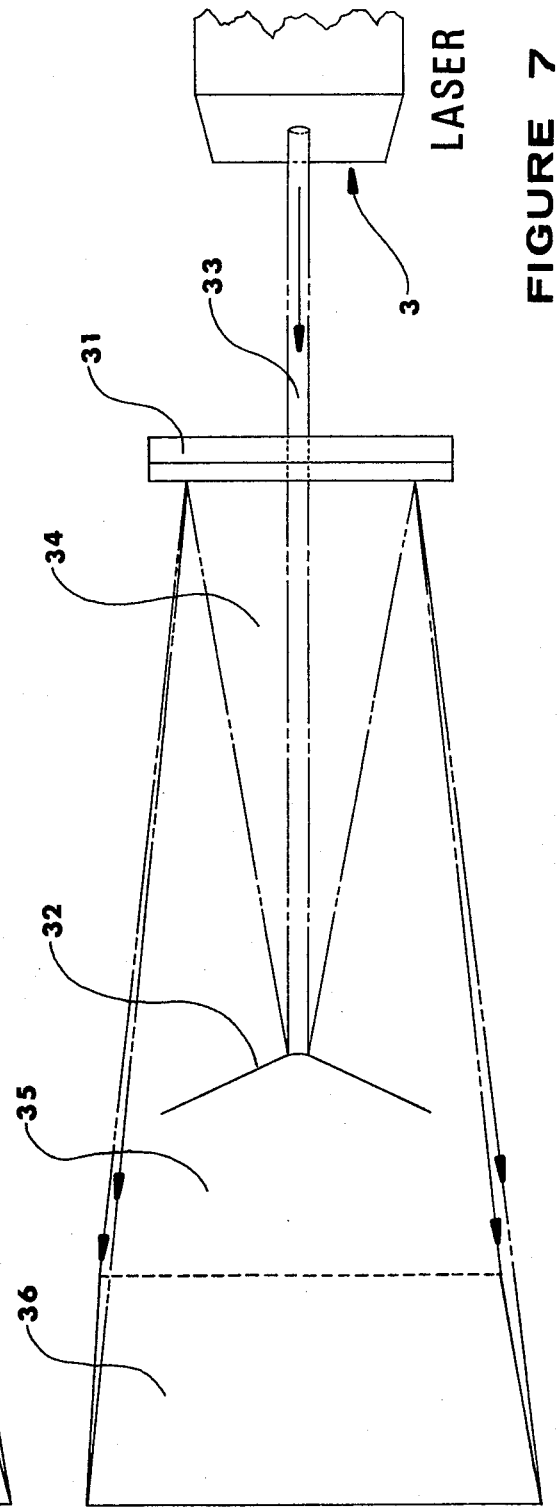
FIGURE 6
FIGURE 7

METHOD AND APPARATUS FOR ACCELERATING CHEMICAL REACTIONS USING A SPREAD BEAM DEFLECTOR WITH SINGLE OR MULTIPLE REFLECTORS

GOVERNMENT LICENSE

The invention described herein may be manufactured and used by or for the government of the United States of America for governmental purposes without the payment of any royalties thereon or therefore.

This invention pertains to a deflection device which reflector elements which spread a coherent light into a selected pattern on the flat or nearly flat surface. The invention is particularly useful in the curing or drying of inks without scorching the paper or similar material to which the ink is affixed.

BACKGROUND OF THE INVENTION

Coherent light from lasers has been used as a heat source in some limited applications. For example, a laser beam has been used to heat a glass preform so that the glass may be extruded into a particular shape as shown in U.S. Pat. No. 3,865,564. Also, laser beams have been deflected to burn or etch a particular pattern on a surface as shown in U.S. Pat. Nos. 3,387,109; 3,949,409; 3,967,285; and 4,049,945. Laser beam deflection for other limited purposes also has been accomplished as shown in U.S. Pat. Nos. 3,465,347; 3,558,208; 3,931,593; and 4,074,203.

Prior art deflection devices have used focusing devices rather than reflective ones. Often to achieve a particular pattern, expensive electrical or mechanical rotating devices have been employed, as in U.S. Pat. No. 3,865,564. Such devices are not only expensive but also subject to frequent malfunctions.

It is therefore an object of this invention to provide an apparatus to spread coherent light so that the spread beam of coherent light can be controlled with respect to energy intensity. Another object of this invention is to provide a deflected beam of coherent light which projects near linear pattern with a near uniform energy distribution on a flat target surface. A further object of the invention is to project the desired amount of electromagnetic energy at a selected frequency for a selected time period to effect the desired chemical reaction in the medium exposed to that energy. It is a further advantage of this invention that deflection of the coherent light into a ribbon-like pattern facilitates the simple calculation of exposure doses and power output with respect to such variables as coherent light frequency, target distance and time.

It is a further object of this invention to use a deformable reflective surface or reflector element placed in an adjustable frame to deflect the coherent light beam.

Other objects of this invention will appear from the following description and the appended claims.

SUMMARY OF THE INVENTION

The invention contemplates a deflector which includes one or more reflectors in which are mounted reflector elements that spread a beam of coherent light onto a flat surface in a near linear pattern with near equal energy distribution along the near linear pattern. The reflector element can be mounted in an adjustable frame with screw adjustments to allow for selective deformation of the reflector surface. Coherent light supplied by conventional laser is deflected on a surface to effect the desired chemical reaction such as the drying or curing of inks.

BRIEF DESCRIPTION OF DRAWINGS

FIG. 1 is a vertical view of one embodiment of the spread beam deflector with two reflector elements.

FIG. 2 is a top plan view of the spread beam deflector shown in FIG. 1.

FIGS. 6 and 7 are alternative arrangements of the reflector elements so that deflector presents different spread patterns.

DESCRIPTION OF THE PREFERRED EMBODIMENTS

Figure 3:
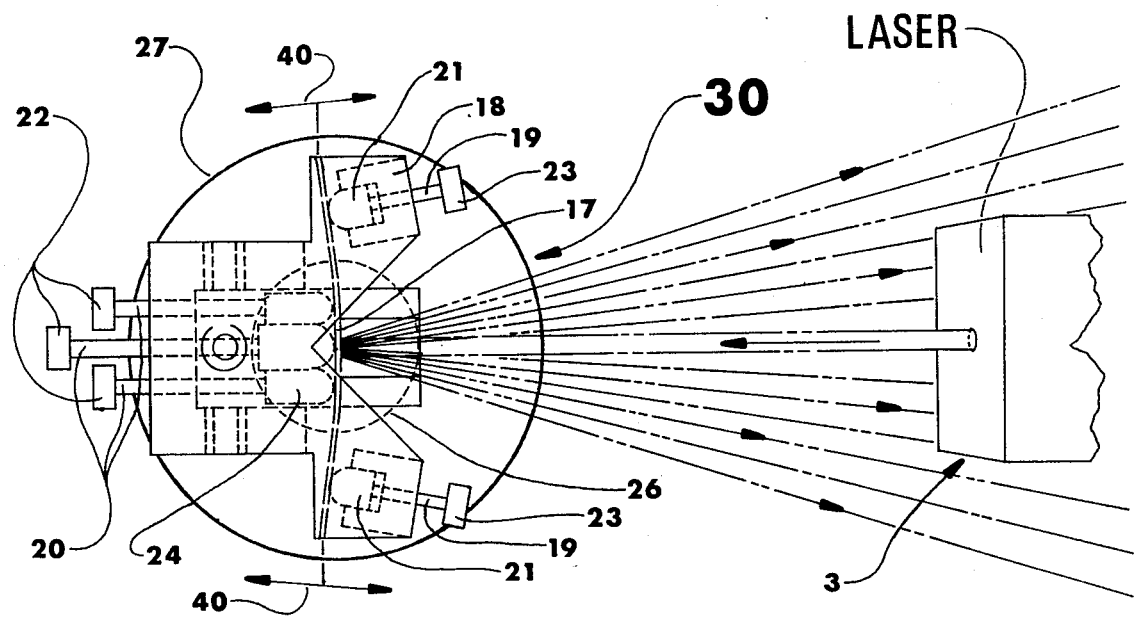
FIG. 3 is a top plan view of a deformable reflector element which is the alternative embodiment for the deflector.

The beam deflector of this invention is one or multiple cylindrical or elliptical mirrors or reflector elements which deflect and spread a beam of coherent light into a near linear pattern of preselected length.

The invention has many applications but is particularly advantageous as an apparatus to facilitate certain required chemical reactions without detrimental effects on the surrounding medium. Traditional heaters or lamps often cannot be controlled to the extent permitted by the beam deflector of this invention. As an example, if an ink is transferred to a surface, quick reactions of ink solvents are desired. Ink solvents are expected to evaporate and ink itself is expected to set or harden. Conventional ink drying or curing methods cause the unwanted side effects of burning or destroying the material carrying the ink. In addition, conventional methods often evaporate volatile solvents in the applied ink which, when enriched with oxygen, can develop into an explosive mist. To preclude the formation of this mist, modern inks use solvents which require higher drying temperatures and more energy to effect the drying process. These higher drying temperatures often cause the paper to deform, scorch, or become brittle.

Also, conventional methods require large heating chambers and special conveyors. Such heating chambers produce excess energy and thus substantial energy losses. Such prior art devices require exhaust systems for transferring the heat into the atmosphere. Such prior art devices create the additional problem of solvent pollution with no opportunity for solvent recovery. Additional energy loss occurs during the warm-up and cooling down periods for prior art ovens or heating chambers. This invention eliminates these problems. Advantageously, the invention permits the use of multiple color printing equipment with the drying process completed before each new color is applied. This invention reduces the size of printing and processing equipment and reduces its cost.

To overcome the disadvantages of the prior art, the present invention uses a spread beam of coherent light. The spread beam, when projected on the target, has almost uniform intensity. Regulation of power output of the laser power source allows for fine adjustments in printing press speed. Tests of the preferred embodiments have demonstrated that materials react when exposed to a spread beam of coherent light producing only the effects needed. Experiments demonstrate that inks have retained the desired appearance after exposure to a $CO_2$ laser beam. Excellent results have also been achieved using neodymium laser. Each type is more responsive to certain selected colors. The selection of a particular frequency between 1.06 and 10.6 micron for the two lasers is based on the particular ink applied to the target surface.

The energy source for this invention is a conventional laser. The usual pattern of a laser beam cross-section is circular or doughnut-shaped, or even slightly elliptical. The pattern shape is made visible when the beam is projected against a target.

This invention converts a laser beam into an almost uniform linear pattern. Since the energy level is reduced by the ratio of the area elongation, the energy striking the target is relatively low.

The spread beam pattern is produced by deflecting a laser beam with one of more cylindrical or elliptical reflector elements, mounted on an adjustable frame or reflector. The curvature of the reflector element is selected to achieve the desired spread of the beam. The selection of the desired curvature is based on the width of the target and how nearly linear a pattern is desired. The reflector elements may be made deformable so that they may be shaped into the desired elliptical curvature needed to accomplish the projection of a desired linear pattern. The length of the spread pattern depends on the in-falling angle under which the beam is deflected from the reflector. The outcoming imaginated line from each point is equal to the infalling angle. In the accompanying drawings, the laser beam is shown as many lines leaving the laser in a parallel array. A cylindrical or elliptical reflector element will deflect the beam in a direction proportional to the angles of the reflector element. The beam, deflected in accordance with this ever changing angle, forms a fan shape array of coherent light. The spread beam distributes the energy in accordance with the distance from the reflector to the target. If more than one reflector is used to spread the beam, the deflections follow the same principle depending on the specific angles of the individual reflector. The intensity of energy falling upon a target at a selected distance is proportional to the spread of the beam. For example, if the original beam cross-section covered an area of 0.045 square inches, an elongated pattern of 0.090 square inches will receive only one half of the energy in any particular area in comparison to the original energy per cross-section of the laser beam.

The spread pattern may be analyzed by the use of waxed carbon-backed paper. Carbonized paper is placed at the position of the target. The laser is operated for a period of approximately one microsecond and is deflected as described above. The spread beam of coherent light will leave an impression on the carbonized paper according to the pattern that the deflector will project during operational use. The reflector elements can then be adjusted or changed in curvature to achieve the desired pattern and retested as described above.

Now having generally described the beam deflector of the invention reference is made to the drawings to describe specific embodiments of the invention which are illustrative of the device when used to dry or cure inks.

The beam deflector as shown in FIGS. 1 and 2 includes two cylindrical reflectors, 1 and 2. Each reflector includes a cylindrical reflector element or mirror, 4, or 4', mounted on a pedestal or base, 5. The pedestal, 5, is pivotally mounted on a stand, 6. The radius of the cylindrical reflector element, 4 or 4', is selected to achieve the desired energy distribution at the relevant distance or range of distances. The cylindrical reflector, 4, is supported on the pedestal by reflector guide pins, 7, positioned on each side of the usable reflective area of the reflector element, 4. The reflector element is rigidly held in place by a slide brace, 8. The slide brace, 8, is slidably mounted on a guide, 9. The slide brace, 8, is moved into and out of a holding position by an adjustment screw, 11, disposed through a screw block, 10. Alternate brace assemblies, 12, may be placed on the pedestal, 5, adjacent to the side brace, 8, as shown in FIG. 2. The slide brace, 8, may be used to hold the reflector element, 4, in place, or alternatively, to deform the reflector element and thus change its curvature from a cylindrical to elliptical shape and, thus the resultant beam spread pattern. This deformation of the reflector element will be described in greater detail herein below with respect to the embodiments shown in FIGS. 3, 4, and 5.

In operation, a beam of coherent light, 13, is produced by a laser, 3. The laser, 3, is selected from several conventional available designs and does not itself constitute a part of this invention. The beam of coherent light, 13, is deflected and spread initially by the reflector element, 4, of the reflector, 2, into an initial spread beam, 14. The initial spread beam, 14, is further deflected and spread by the reflector element, 4, of reflector, 1, into a further spread beam, 15. The further spread beam strikes the target, 16, in a near linear pattern of near equal energy distribution. The target may be a stationary or moving sheet or web.

Figure 4:
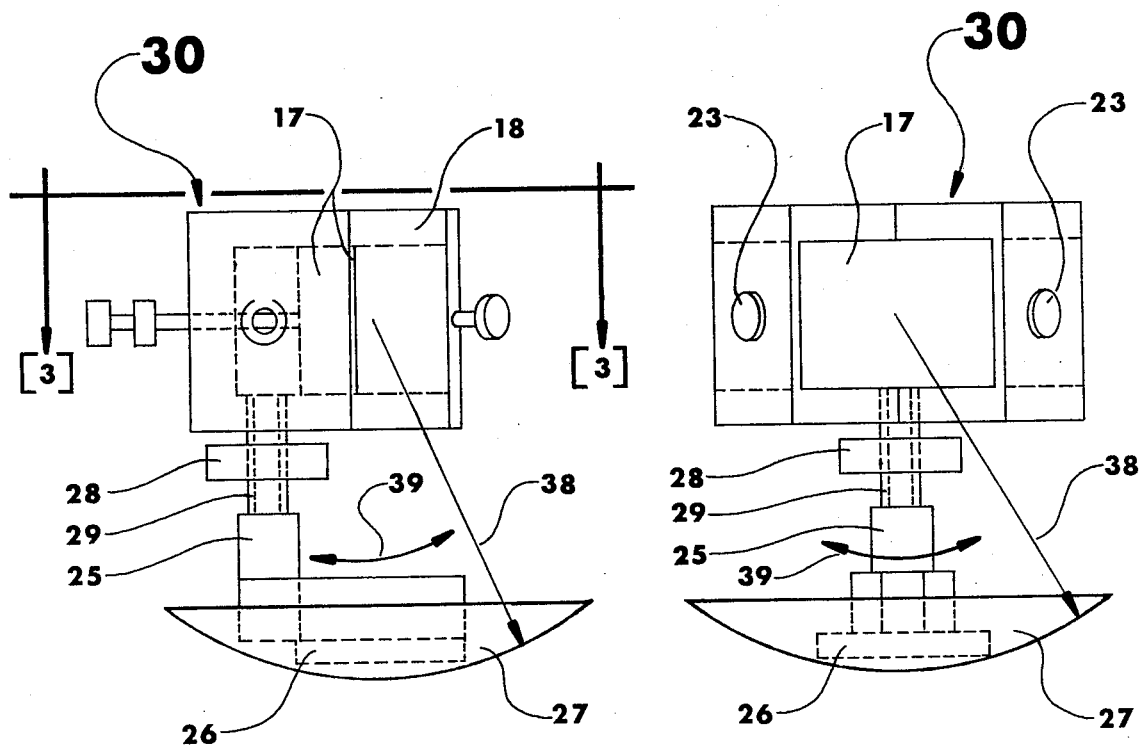
FIG. 4 is a vertical view of the reflector element as shown in FIG. 3 with adjustable mounting apparatus.
Figure 5:
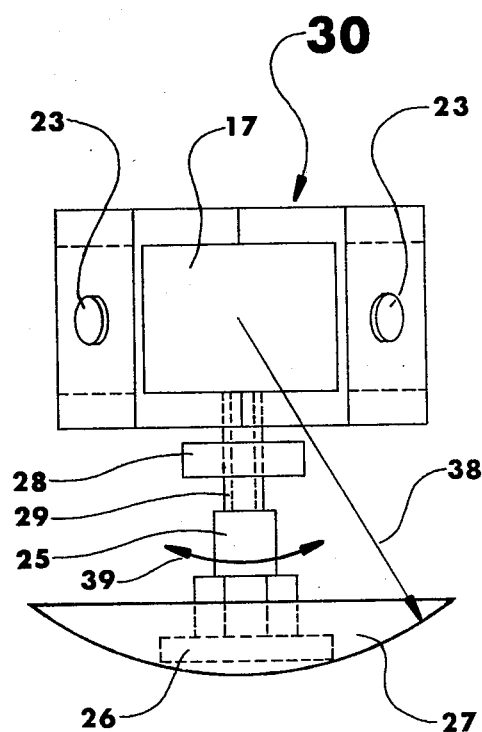
FIG. 5 is a rear vertical view of the reflector element as is shown in FIG. 3.

Another embodiment of the invention is shown in FIGS. 3, 4, and 5. The alternate embodiment includes a deformable reflector, element 17, mounted in a frame, 18. The ends of the deformable reflector element, 17, are held by the slide braces, 21. In the frame, 18, are mounted two sets of adjusting screws, 19 and 20. The adjusting screws, 20, include three separate screws which are individually adjustable by the heads, 22. The slide brace, 21, moved by the adjusting screw, 24, are pressed against the deformable reflector element, 17. By adjustment at the position of the slide brace, 21, the reflector element, 17, can be deformed into the desired curvature. The adjusting screws, 19, can be moved by the head, 23, to achieve similar deformation of reflector element, 17.

The frame, 18, is mounted on a stem, 29. The stem, 29, is slidably mounted in a pedestal, 25. Stem, 29, can either be moved or fixed depending on the friction applied by the tightening of a knurled knob, 28. Thus, the height of the reflector element, 17, with respect to the pedestal, 28, is adjustable. A magnet, 26, is affixed to the bottom of the pedestal, 25. The pedestal, 25, and attached magnet, 26, are slidably mounted on a dish, 27. Movement of the pedestal in relation to the dish will vary the deflection angle of the reflector element, 17.

The arrows, 39, and 40, note the directions in which the reflector, 30, may be moved within the dish, 27. It is an advantage of this embodiment of the invention that when such movement is made, the distance, 38, from the center of the reflector element 17 to the dish remains the same, only the angle of deflection is varied.

When mounted for operation the reflector, 30, is used to spread a beam of coherent light in the same manner as the reflectors 1 and 2 shown in FIGS. 1 and 2.

A third embodiment is shown in FIGS. 6 and 7. The third embodiment employs reflector of similar designs as those described above. However, the second reflector, 31, is rotated 90° to initial spread beam 34. Thus, the further spread beam, 35, achieves a square or rectangular pattern when striking the target, 36, thus reducing the energy level accordingly. Such a pattern is particularly useful in drying inks on separately printed sheets which are printed by a flat press rather than a web or continuous sheet as on a roller press.

Although the invention has been particularly disclosed for a device for drying or curing inks, it is to be understood that the invention is applicable to other chemical processes which can use coherent light to accelerate them. It is also obvious to one of ordinary skill in the art that the foregoing is presented by way of example only and the invention is not to be unduly restricted thereby since modifications may be made in the structure of the various parts without functionally departing from the spirit of this invention.

What I claim is:

1. Laser apparatus comprising a laser source which produces a beam of coherent radiation having a substantially circular outline, and a stationary optical system arranged to disperse and thereby spread said beam in a controlled manner into an elongated elliptical band of radiation having substantially uniform energy density across the expanded dimension of said beam, said optical system including at least one deflecting means arranged to intercept and deflect said beam across one tranverse dimension so that said beam is converted into a spread band of substantially uniform radiation having an elongated elliptical cross-section of greater area than the cross-section of the impinging circular beam of radiation.

2. Laser apparatus according to claim 1 in which at least one deflecting means consists of a substantially cylindrical convex reflecting surface.

3. Laser apparatus according to claim 2 in which said substantially cylindrical convex reflecting surface is curved with relation to the energy distribution within the impinging beam of radiation so as to deflect the beam into an elongated elliptical spread band of radiation having a substantially uniform distribution of energy across its longer transverse dimension.

4. Laser apparatus according to claim 1 in which at least one deflecting means is mounted on a spherically rotatable base such that the direction of the deflected beam of radiation may be adjusted while causing the impinging beam of radiation to strike said deflecting means at substantially the same location.

5. Laser apparatus according to claim 1 in which a second deflecting means is provided to intercept and deflect said elongated elliptical band of radiation across its shorter transverse dimension and thereby convert said band into a spread band of radiation having a substantially rectangular cross-section of greater area than the cross-section of the initial beam of radiation.

6. A method for accelerating the progress of chemical reactions comprising the steps of
  (1) producing a beam of coherent radiation having a substantially circular outline,
  (2) deflecting said beam of coherent radiation along one transverse dimension into a spread band of radiation having an elongated elliptical outline, and
  (3) passing an uncured coated surface beneath said spread band of radiation at a speed which results in an accumulation of radiation sufficient to substantially cure at least the surface of the coating without damaging the coating or the material on which the coating has been deposited.

7. The method of claim 6 in which the frequency of said beam of coherent radiation has been particularly selected in relation to the composition of the coating so as to accelerate the curing operation.

8. The method of claim 6 wherein the chemical reaction involves the evaporation of a solvent.

9. The method of claim 6 wherein the chemical reaction involves the drying of ink in printing operations.

10. Laser apparatus according to claim 1 in which at least one deflecting means consists of a substantially elliptical convex reflecting surface.

11. Laser apparatus according to claim 10 in which said substantially elliptical convex reflecting surface is curved with relation to the energy distribution within the impinging beam of radiation so as to deflect the beam into an elongated elliptical spread band of radiation having a substantially uniform distribution of energy across its longer transverse dimension.

* * * * *